(12) United States Patent
Iwasaki

(10) Patent No.: US 7,007,766 B2
(45) Date of Patent: Mar. 7, 2006

(54) FUEL CELL VEHICLE

(75) Inventor: Yasukazu Iwasaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 298 days.

(21) Appl. No.: 10/069,015

(22) PCT Filed: Aug. 28, 2001

(86) PCT No.: PCT/JP01/07382

§ 371 (c)(1),
(2), (4) Date: Feb. 20, 2002

(87) PCT Pub. No.: WO02/20300

PCT Pub. Date: Mar. 14, 2002

(65) Prior Publication Data

US 2002/0136935 A1    Sep. 26, 2002

(51) Int. Cl.
*B60K 1/00* (2006.01)
(52) U.S. Cl. ............... 180/65.2; 180/65.1; 180/65.3
(58) Field of Classification Search ............... 180/65.1, 180/65.2, 65.3, 65.4, 165, 65.8
See application file for complete search history.

(56) References Cited

U.S. PATENT DOCUMENTS 5,631,532 A * 5/1997 Azuma et al. ............... 320/102
5,648,182 A * 7/1997 Hara et al. ..................... 429/20
5,712,052 A * 1/1998 Kawatsu ....................... 429/13
5,837,393 A   11/1998 Okamoto
6,554,261 B1 * 4/2003 Katagiri et al. ............. 261/154
6,580,977 B1 * 6/2003 Ding et al. .................... 701/22
6,635,373 B1 * 10/2003 Kobayashi .................... 429/23
6,672,415 B1 * 1/2004 Tabata ....................... 180/65.2

FOREIGN PATENT DOCUMENTS

| DE | 100 33 036 | 1/2001 |
| EP | 0 911 629 | 4/1999 |
| EP | 0 972 668 | 1/2000 |
| JP | 9-63620 | 3/1997 |
| JP | 9-180744 | 7/1997 |
| JP | 2001-23678 | 1/2001 |

OTHER PUBLICATIONS

Nadal et al., "Development of a Hybrid Fuel Cell/Battery Powered Electric Vehicle," International Journal of Hydrogen Energy, vol. 21, No. 6 (Jun. 1, 1996), pp. 497-505.

* cited by examiner

*Primary Examiner*—Christopher P. Ellis
*Assistant Examiner*—Bridget Avery
(74) *Attorney, Agent, or Firm*—Foley & Lardner LLP

(57) ABSTRACT

A CO sensor (250) which detects CO contained in the air supplied to a fuel cell (200) by a compressor (202), and a sensor (206) which detects the state of charge (SOC) of a battery (207), are provided in a fuel cell vehicle. A controller (254) controls operation and stop of the fuel cell based on CO concentration and the state of charge of the battery (207), and stops operation of the fuel cell (200) at a lower CO concentration the higher the state of charge of the battery (207).

9 Claims, 6 Drawing Sheets

FUEL CELL VEHICLE

FIELD OF THE INVENTION

This invention relates to a fuel cell vehicle.

BACKGROUND OF THE INVENTION

Fuel cells exist in various types including a solid oxide fuel cell (SOFC), molten carbonate fuel cell (MCFC), phosphoric acid fuel cell (PAFC), polymer electrolyte fuel cell (PEFC) and an alkaline fuel cell (AFC) according to the components of the electrolyte used.

In PEFC which use a fluorine type ion exchange membrane as an electrolyte, a high performance ion exchange membrane has been developed which permits a current density many times higher than in the prior art to be obtained. As a result, it is becoming possible to install a fuel cell of sufficient output in the limited installation space of a vehicle.

Due to exhaust gas emission restrictions in the State of California in the U.S.A., the application of PEFC to electric vehicles is being considered, but there are still no fuel cell vehicles (FCV) on the market, and only experimental vehicles have been announced.

The FCV comprises a fuel cell which generates power using hydrogen fuel and air, an air feeder which supplies air to the fuel cell, a fuel supply device which supplies fuel gas containing hydrogen to the fuel cell, and a motor which changes electric power into a drive force. Moreover, it is also common to provide a storage battery in addition to the fuel cell.

Different methods of supplying the fuel are being considered, such as storing hydrogen and supplying this to the fuel cell, or converting a fuel such as methanol or gasoline to reformate gas containing hydrogen using a reformer, and supplying this to the fuel cell.

SUMMARY OF THE INVENTION

When a vehicle (FCV) which uses PEFC as power source runs in a tunnel, a compressor aspirates the carbon monoxide (CO), nitrogen oxide (NOx) and oil components discharged from a vehicle (ICEV) which uses a the conventional combustion engine as power source to supply the fuel cell.

As shown in FIG. 1, the inside of a tunnel 106 is an environment which tends to fill up with the exhaust gas of an ICEV 105. If a FCV 103 runs in this tunnel 106, a compressor 101 will aspirate the exhaust gas through a filter 102, and supply it to a fuel cell 100.

Of the discharged substances, CO poisons the electrode catalyst of the fuel cell, and remarkably reduces its activity. NOx is taken into the water system and the polymer film of the fuel cell which swells with nitric acid or nitrous acid, degrades various ingredients and the polymer film due to its oxidizing nature, and reduces the performance of the fuel cell. As the exchange time of the deionization filter of the water system is advanced, maintenance costs increase. Moreover, the oil components adhere to the electrode catalyst of the fuel cell, degrade the electrode catalyst, and reduce the performance of the fuel cell.

If the performance of the air filter is increased to deal with this, manufacturing costs and maintenance costs not only increase, but as the pressure loss in the air filter becomes large, the power consumption of the compressor will increase, and the fuel cost-performance of the FCV will fall.

JP-A-H9-63620 published by the Japanese Patent Office in 1997 proposes a method of performing oxidation treatment of the CO in the intake air. However, in this approach, excess fuel is needed to preheat the air by a heating burner. Moreover, to cool air which has been heated, the heat which must be radiated by the radiator increases. As the fuel cell itself gives off a lot of exhaust heat, the increase in the heat which must be radiated by the radiator is undesirable.

It is difficult to remove the oil components in the atmospheric air by oxidation.

Moreover, as it is theoretically impossible to remove NOx by oxidization, it must be removed by decomposing it into nitrogen and oxygen, but it is very difficult to make the decomposition reaction, which is a reduction reaction, in the oxidizing atmosphere of atmospheric air containing a large amount of oxygen.

In JP-A-H9-180744 published by the Japanese Patent Office in 1997, a method is proposed wherein a toxic substance is detected, and power generation by the fuel cell is stopped if intake of the toxic substance is detected. However, when this approach is applied to a FCV without modification, supply of electric power may be insufficient and running performance may fall.

It is therefore an object of this invention to prevent the performance of the fuel cell of a FCV falling due to toxic substances such as CO in the intake air without reducing the running performance of the FCV.

In order to achieve above object, this invention provides a fuel cell vehicle, comprising a fuel cell which generates power using fuel gas containing hydrogen), an air feeder which supplies air to the fuel cell, a fuel supply device which supplies fuel gas to the fuel cell, a motor which drives the vehicle with power generated by the fuel cell, a storage battery which stores power generated by the fuel cell and power regenerated by the motor, and supplies the stored power to the motor, a sensor which detects a toxic substance contained in the air supplied by the air feeder, the toxic substance causing the performance of the fuel cell to decrease, a sensor which detects the state of charge of the battery, and a microprocessor programmed to control operation and stop of the fuel cell based on the result of detecting the toxic substance and the state of charge of the battery.

The details as well as other features and advantages of this invention are set forth in the remainder of the specification and are shown in the accompanying drawings.

DESCRIPTION OF THE PREFERRED EMBODIMENTS

Figure 1:
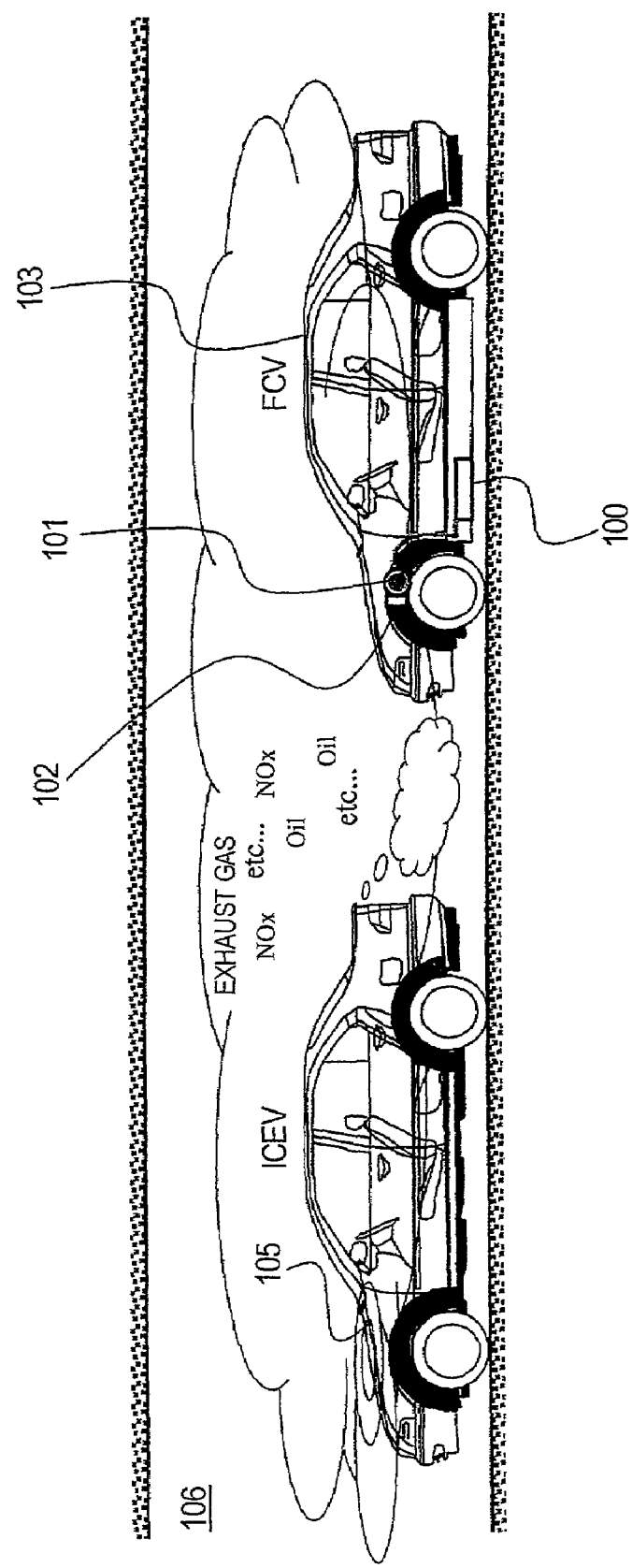
FIG. 1 is a diagram showing the environment when a fuel cell vehicle (FCV) runs in a tunnel together with a conventional internal combustion engine vehicle (ICEV).
Figure 2:
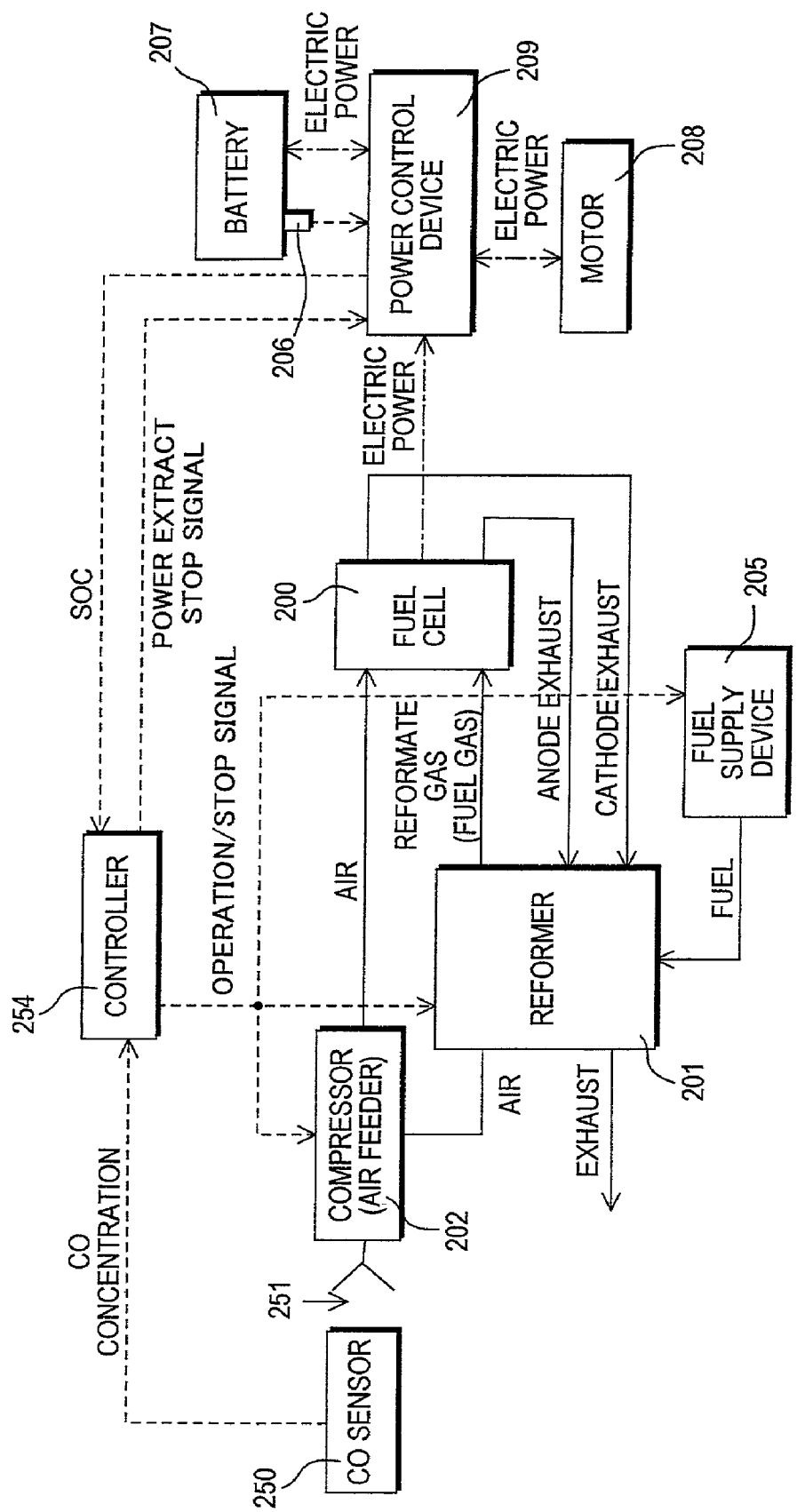
FIG. 2 is a block diagram showing the schematic construction of the FCV according to this invention.

Referring to FIG. 2 of the drawings, the numeral 200 is a fuel cell which generates power using fuel gas containing hydrogen and air. The numeral 201 is a reformer which reforms fuel (for example, methanol or gasoline which are liquid fuels) into reformate gas containing hydrogen, supplies this to the fuel cell 200 as fuel gas. The numeral 202 is a compressor as an air feeder which supplies air to the fuel cell 200. The numeral 205 is a fuel supply device which supplies fuel and water required for reforming the fuel if needed. The numeral 208 is a motor for running the vehicle.

The numeral 207 is a storage battery which stores power generated by the fuel cell 200 and power regenerated when the motor 208 decelerates, or supplies the power for running the motor 208. The numeral 209 is a power control device which controls exchange of power between the fuel cell 200, battery 207 and motor 208, and the amount of power extracted from the fuel cell 200.

The power control device 209 computes the state of charge (SOC) of the battery 207. The SOC becomes larger the larger the electrical energy stored in the battery 207 increases, and is 100% at the maximum capacity of the battery 207. It becomes smaller as the electrical energy stored in the battery 207 decreases, and when the electrical energy stored in the battery 207 approaches zero, it will be 0%. The SOC may be computed for example by looking up a table showing the relation between the voltage between the terminals of the battery 207 detected by a voltmeter 206, and the SOC.

The numeral 250 is a CO sensor which detects CO concentration in the air aspirated by the compressor 202 at an inlet port 251 of the compressor 202. A controller 254 controls operation or stop of the reformer 201, compressor 202, fuel supply device 205 and fuel cell 200 based on the CO concentration detected by the CO sensor 250, and the state of charge of the battery 207 computed by the power control device 209. The fuel cell 200 may be operated by operating the reformer 201, and the fuel cell 200 may be stopped by stopping the reformer 201. Such an operation is disclosed in detail in JP-A-2001-23678 published by the Japanese Patent Office in 2001.

Next, operation/stop control of the fuel cell 200 performed by the controller 254 will be described referring to the flowchart in FIG. 3.

First, in a step S1, the CO concentration detected by the CO sensor 250 is read. In a step S2, the time average value of the CO concentration is computed using previous values of CO concentration stored in the memory of the controller 254, and the value read in the step S1.

In a step S3, the SOC of the battery 207 computed by the power control device 209 is read.

Figure 4:
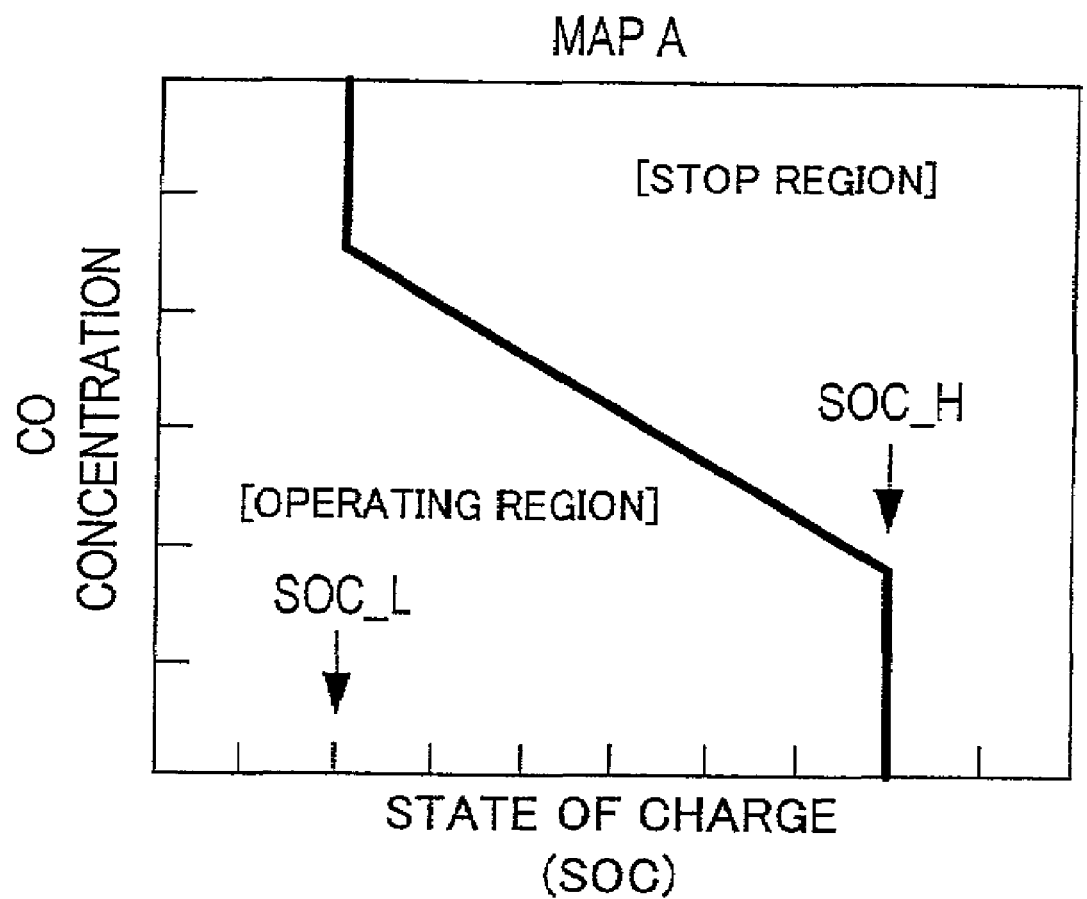
FIG. 4 is a map used for determining whether to operate or stop the fuel cell.

In a step S4, it is determined whether to operate or stop the fuel cell by looking up a map A shown in FIG. 4.

In steps S5, S6, it is determined whether the reformer 201 is operating. If the reformer 201 is operating, operation is continued, whereas if the reformer 201 has stopped, the reformer 201 is restarted.

In steps S7, S8, it is determined whether the reformer 201 is operating. If the reformer 201 has stopped, the stop state is continued, whereas if the reformer 201 is operating, the reformer 201 is stopped.

The reformer 201 is operated by operating the fuel supply device 205 and compressor 202 and supplying fuel and air. The reformer 201 is stopped by stopping the fuel supply device 205 and compressor 202 and stopping the fuel and air supply. Whether the reformer 202 is operating or not can be decided based on whether the controller 254 outputs the air supply signal and fuel supply signal to the fuel supply device 205 and compressor 202.

The map A shown in FIG. 4 sets an operating region and a stop region of the fuel cell 200 using the CO concentration and the SOC as parameters. It is preferable to suppress the stop of the fuel cell for preventing the battery overdischarge and maintaining the SOC to some degree. On the other hand, it is preferable to stop the fuel cell for preventing the deterioration of the fuel cell. Therefore, the map A is set so that the fuel cell is stopped at lower CO concentration the larger the SOC becomes.

According to the map A shown in FIG. 4, if the state of charge is less than a first reference value SOC_L, to prevent overdischarge of the battery 207, the reformer 201 is operated regardless of the CO concentration in the air aspirated by the compressor 202, and the fuel cell 200 is made to generate power. On the other hand, if the state of charge is higher than a second reference value SOC_H set higher than the first reference value SOC_L, sufficient drive force can be obtained for a while (e.g., until passing through a tunnel) with the power supplied from the battery 207 to the motor 208 alone, so the reformer 201 is stopped regardless of the CO concentration in the air aspirated by the compressor 202.

Here, the first reference value SOC_L is set according to the starting time of the fuel cell system (required time for restarting the fuel cell system). For example, the first reference value SOC_L is set to 20% when the starting time is short, and it is set to 60% when the starting time is long. The second reference value SOC_H is set, for example, to 80%.

Due to the above mentioned operation/stop control of the fuel cell 200, when the vehicle runs in the environment which may deteriorate the fuel cell 200, the fuel cell 200 is stopped if the SOC is sufficient. Therefore, the deterioration of the fuel cell 200 is prevented without reducing the running performance of the vehicle. This control can be easily performed by deciding whether to operate or stop the fuel cell by referring the map A.

Energy efficiency may fall if the reformer 201 is stopped and restarted frequently due to the momentary variation of the CO concentration, such as when passing a diesel vehicle, but by performing control using the time average value of CO concentration as in this embodiment, such a frequent change-over can be suppressed and high efficiency can be maintained.

By using the CO censor for detecting the toxic substances in the intake air, the deterioration of the fuel cell due to CO, which deteriorates the fuel cell mostly, can be prevented.

If a sensor which detects toxic substances in the aspirated air other than CO, for example, NOx and oil components, is provided, and the same control as the above can be performed according to the concentrations of these substances.

Figure 5:
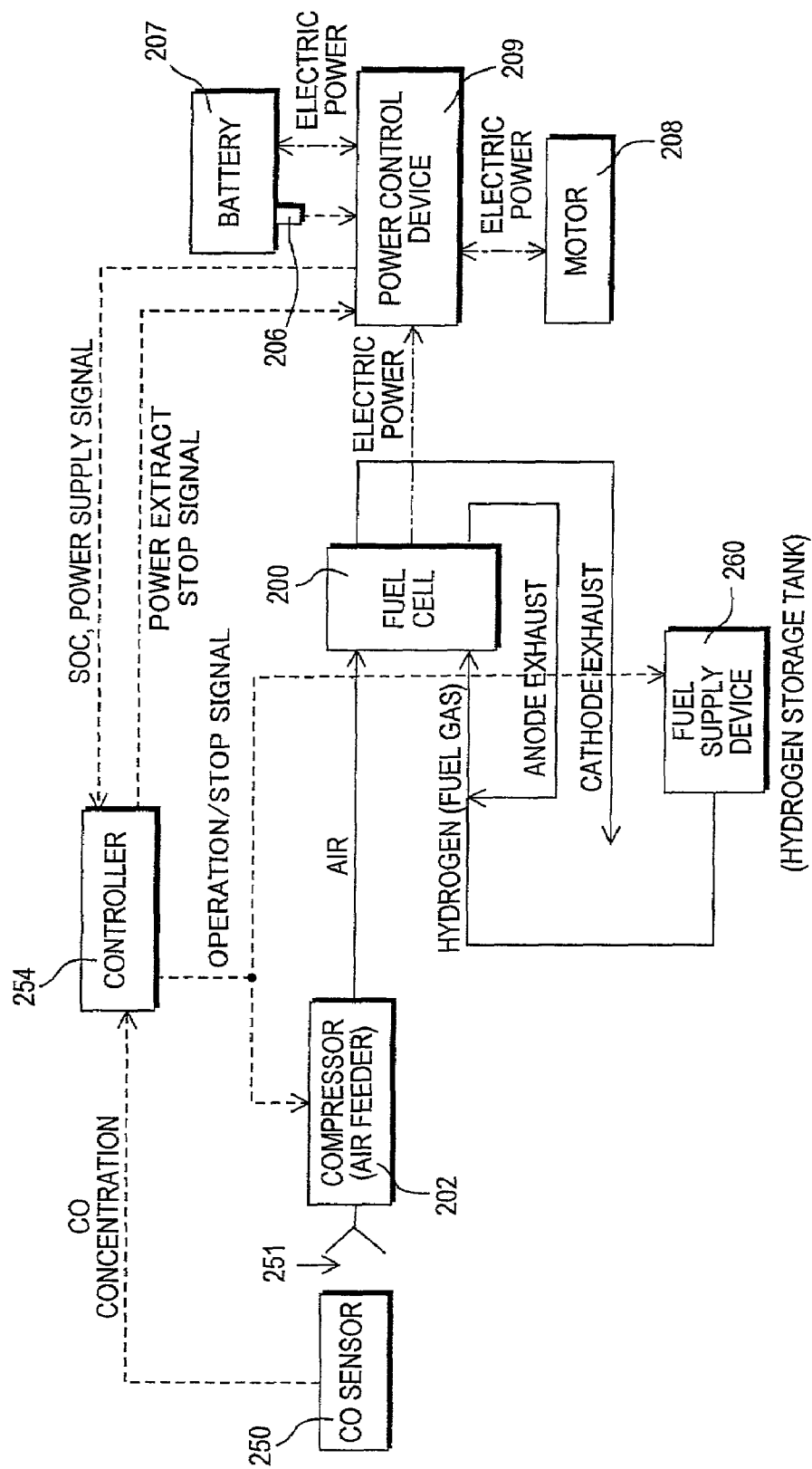
FIG. 5 is similar to FIG. 2 but showing a second embodiment of this invention.

This invention may moreover be applied not only to a fuel cell vehicle which generates hydrogen supplied to the fuel cell by reforming fuel, but also to a fuel cell vehicle comprising a hydrogen storage device (hydrogen storage tank, metal hydride alloy, etc) for storing hydrogen wherein the hydrogen stored in the device is directly supplied to the fuel cell as shown in FIG. 5 (second embodiment). In this case, operation and stopping of the fuel cell are controlled by controlling the supply of hydrogen.

Figure 6:
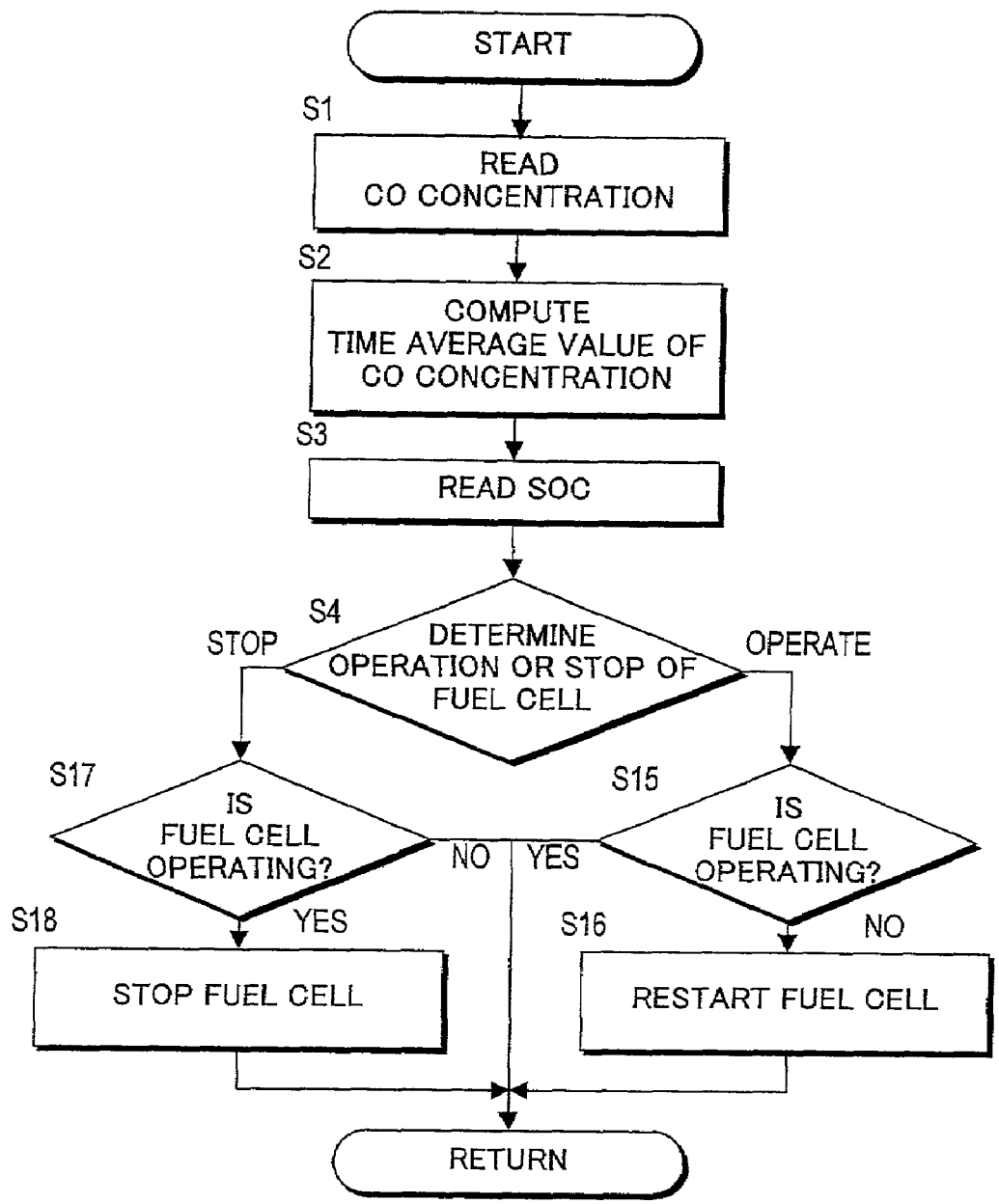
FIG. 6 is a flowchart showing the operation and stop control of the fuel cell in the second embodiment.

FIG. 6 shows the operation/stop control performed by the controller 254 for the fuel cell 200 with the hydrogen storage tank as shown in FIG. 5.

Figure 3:
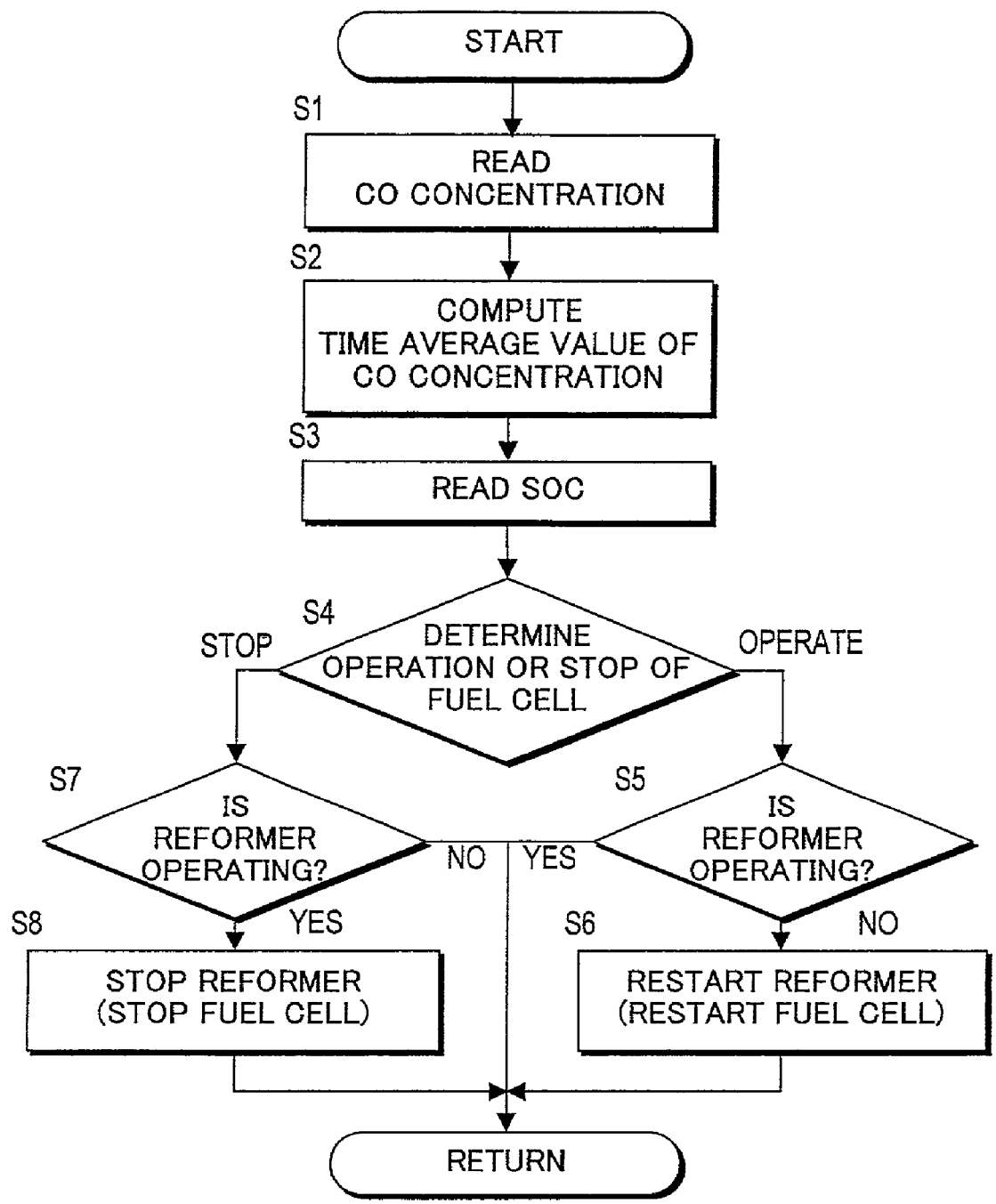
FIG. 3 is a flowchart showing the operation and stop control of the fuel cell.

The steps S1–S4 are the same as FIG. 3. In the steps S1–S4, it is determined whether to operate or stop the fuel cell 200 based on the CO concentration and the SOC.

In steps S15, S16, it is determined whether the fuel cell 200 is operating. If the fuel cell 200 is operating, operation is continued, whereas if the fuel cell 200 has stopped, the fuel cell 200 is restarted.

In steps S17, S18, it is determined whether the fuel cell is operating. If the fuel cell 200 has stopped, the stop state is continued, whereas if the fuel cell 200 is operating, the fuel cell 200 is stopped.

When the controller 254 is outputting the fuel supply signal to the fuel supply device (hydrogen storage tank) 260 and outputting the operation signal to the compressor 202 and the power control device 209 is receiving the power supply signal, the controller 254 decides that the fuel cell 200 is operating. When the controller 254 is not outputting the fuel supply signal to the fuel supply device (hydrogen storage tank) 260 and not outputting the operation signal to the compressor 202 and the power control device 209 is not receiving the power supply signal, the controller 254 decides that the fuel cell 200 is in the stop state.

The fuel cell 200 is operated by operating the fuel supply device 260 and compressor 202 and supplying fuel and air. The fuel cell 200 is stopped by stopping the fuel supply device 260 and compressor 202 and stopping the fuel and air supply.

If the fuel cell has a reformer which generates hydrogen, as the operation of the reformer can be controlled by controlling the fuel supply from the fuel supply device, the operation/stop control of the fuel cell can be performed in the same manner as in the case of the fuel cell with the hydrogen storage device.

By performing the above-mentioned control, the deterioration of the fuel cell can be prevented even when the toxic substance concentration in the intake air is high.

The entire contents of Japanese Patent Application P2000-266857 (filed Sep. 4, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

INDUSTRIAL FIELD OF APPLICATION

This invention can be used for vehicles provided with a fuel cell, and is effective in preventing decrease of performance of a fuel cell due to CO, NOx and oil components contained in intake air.

What is claimed is:

1. A fuel cell vehicle, comprising:
a fuel cell which generates power using fuel gas containing hydrogen;
an air feeder which draws in untreated air from outside the vehicle and supplies the untreated air to the fuel cell;
a fuel supply device which supplies fuel gas to the fuel cell;
a motor which drives the vehicle with power generated by the fuel cell;
a storage battery which stores power generated by the fuel cell and power regenerated by the motor, and supplies the stored power to the motor;
a sensor which detects a toxic substance contained in the untreated air supplied by the air feeder, the toxic substance causing the performance of the fuel cell to decrease; a sensor which detects the state of charge of the battery; and
a processor programmed to control operation and stop of the fuel cell based on the result of detecting the toxic substance and the state of charge of the battery.

2. The fuel cell vehicle as defined in claim 1, wherein the processor is further programmed to stop operation of the fuel cell at a lower toxic substance concentration the higher the state of charge of the battery.

3. The fuel cell vehicle as defined in claim 1, wherein the processor is further programmed to operate the fuel cell when the state of charge of the battery is less than a first reference value, and to stop the fuel cell when the state of charge of the battery is greater than a second reference value which is greater than the first reference value, regardless of the toxic substance detection result.

4. The fuel cell vehicle as defined in claim 1, wherein the processor is further programmed to operate or stop the fuel cell based on the time average value of the toxic substance concentration, and the state of charge of the battery.

5. The fuel cell vehicle as defined in claim 1, wherein the sensor which detects the toxic, substance concentration is a sensor which detects carbon monoxide.

6. The fuel cell vehicle as defined in claim 1, wherein the processor is further programmed to determine whether to operate or stop the fuel cell by looking up a map which sets an operating region and a stop region of the fuel cell having the toxic substance concentration and state of charge of the battery as parameters.

7. The fuel cell vehicle as defined in claim 1, wherein the fuel supply device comprises a reformer which generates hydrogen, and the processor is further programmed to control operation or stop of the fuel cell by controlling the operation of the reformer.

8. The fuel cell vehicle as defined in claim 1, wherein the fuel supply device supplies stored hydrogen to the fuel cell, and the processor is further programmed to operate or stop the fuel cell by controlling the supply of hydrogen from the fuel supply device to the fuel cell.

9. The fuel cell vehicle as defined in claim 1, wherein the air feeder has an inlet port and the sensor is positioned to sense the untreated air drawn in at the inlet port.

* * * * *